United States Patent
Gossett et al.

(10) Patent No.: US 8,170,048 B1
(45) Date of Patent: May 1, 2012

(54) DYNAMIC SPECTRUM ALLOCATION AND ACCESS FOR USER DEVICE

(75) Inventors: Carroll Philip Gossett, Mountain View, CA (US); Hal R. Varian, Danville, CA (US); Michial Allen Gunter, Oakland, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 12/363,282

(22) Filed: Jan. 30, 2009

Related U.S. Application Data

(60) Provisional application No. 61/024,714, filed on Jan. 30, 2008.

(51) Int. Cl.
*H04L 12/413* (2006.01)

(52) U.S. Cl. .......................... 370/447; 705/37

(58) Field of Classification Search .................. 370/229, 370/230, 235, 310–350, 431, 441–447; 705/37
See application file for complete search history.

(56) References Cited

U.S. PATENT DOCUMENTS

| | | |
|---|---|---|
| 5,061,997 A | 10/1991 | Rea et al. |
| 5,769,527 A | 6/1998 | Taylor et al. |
| 5,812,422 A | 9/1998 | Lyons |
| 5,940,049 A | 8/1999 | Hinman et al. |
| 5,969,485 A | 10/1999 | Hunt |
| 5,983,280 A | 11/1999 | Hunt |
| 6,029,122 A | 2/2000 | Hunt |
| 6,175,771 B1 | 1/2001 | Hunt et al. |
| 6,429,867 B1 | 8/2002 | Deering |
| 6,538,797 B1 | 3/2003 | Hunt |
| 6,548,967 B1 | 4/2003 | Dowling et al. |
| 6,549,326 B2 | 4/2003 | Hunt et al. |
| 6,597,132 B2 | 7/2003 | Hunt et al. |
| 6,765,544 B1 | 7/2004 | Wynne |
| 6,774,584 B2 | 8/2004 | Lys et al. |
| 6,801,353 B2 | 10/2004 | Hunt et al. |
| 6,891,656 B2 | 5/2005 | Hunt |
| 6,894,443 B2 | 5/2005 | Hunt et al. |
| 6,922,679 B2 | 7/2005 | Watkins |
| 7,057,797 B2 | 6/2006 | Hunt |
| 7,139,617 B1 | 11/2006 | Morgan et al. |
| 7,148,632 B2 | 12/2006 | Berman et al. |
| 7,161,562 B1 | 1/2007 | Hunt |
| 7,242,152 B2 | 7/2007 | Dowling et al. |

(Continued)

FOREIGN PATENT DOCUMENTS

JP 2003068473 3/2003

OTHER PUBLICATIONS

Before the Federal Communications Commission. Comments of CTIA-The Wireless Association. Jun. 6, 2007. 10 pages.

(Continued)

*Primary Examiner* — Ricky Ngo
*Assistant Examiner* — Wei-Po Kao
(74) *Attorney, Agent, or Firm* — Fish & Richardson P.C.

(57) ABSTRACT

Methods, systems, and apparatus, including computer program products, in which access allocations to a spectrum band and transmit rights to the access allocations are defined. Real-time auction bids for the transmit rights to the access allocations to the spectrum band are sent from a participating device, and the participating device iteratively increments the bids until a maximum bid is reached or a transmit right is awarded to the participating device.

10 Claims, 7 Drawing Sheets

U.S. PATENT DOCUMENTS

| | | | |
|---|---|---|---|
| 2002/0078221 | A1 | 6/2002 | Blackwell et al. |
| 2003/0069828 | A1 | 4/2003 | Blazey et al. |
| 2004/0160198 | A1 | 8/2004 | Hewlett et al. |
| 2004/0252486 | A1 | 12/2004 | Krause |
| 2005/0057543 | A1 | 3/2005 | Hunt et al. |
| 2005/0083487 | A1 | 4/2005 | Hunt et al. |
| 2005/0086589 | A1 | 4/2005 | Hunt |
| 2005/0094635 | A1 | 5/2005 | Hunt |
| 2005/0190985 | A1 | 9/2005 | Hunt |
| 2005/0200318 | A1 | 9/2005 | Hunt et al. |
| 2005/0206328 | A1 | 9/2005 | Hunt |
| 2005/0207163 | A1 | 9/2005 | Hunt |
| 2005/0213335 | A1 | 9/2005 | Hunt |
| 2006/0015354 | A1* | 1/2006 | Shrum et al. ............ 705/1 |
| 2006/0106714 | A1 | 5/2006 | Goldberg et al. |
| 2006/0158461 | A1 | 7/2006 | Reese et al. |
| 2006/0187532 | A1 | 8/2006 | Hewlett et al. |
| 2006/0227297 | A1 | 10/2006 | Hunt |
| 2007/0086754 | A1 | 4/2007 | Lys et al. |
| 2008/0108365 | A1 | 5/2008 | Buddhikot et al. |
| 2008/0222021 | A1* | 9/2008 | Stanforth et al. ............ 705/37 |
| 2008/0255953 | A1 | 10/2008 | Chang et al. |
| 2008/0275790 | A1* | 11/2008 | Campbell ............ 705/26 |
| 2008/0279147 | A1* | 11/2008 | Hassan et al. ............ 370/330 |

OTHER PUBLICATIONS

Federal Communications Commission. Press Release: FCC Adopts Spectrum Leasing Rules and Streamlined Processing For License Transfer and Assignment Applications, and Proposes Further Steps to Increase Access to Spectrum Through Secondary Markets. May 15, 2003. 4 pages.

Federal Communications Commission. 15 F.C.C.R. 24203. Notice of Proposed Rulemaking: In The Matter of Promoting Efficient Use of Spectrum Through Elimination of Barriers to the Development of Secondary Markets. Adopted: Nov. 9, 2000, Released: Nov. 27, 2000. 47 pages.

Federal Communications Commission. FCC 03-113. In the Matter of: Promoting Efficient Use of Spectrum Through Elimination of Barriers to the Development of Secondary Markets. Adopted: May 15, 2003, Released: Oct. 6, 2003. 198 pages.

Federal Communications Commission. 19 F.C.C.R. 17503. Second Report and Order, Order on Reconsideration, and Second Further Notice of Proposed Rulemarking: In the Matter of Promoting Efficient Use of Spectrum Through Elimination of Barriers to the Development of Secondary Markets. Adopted: Jul. 8, 2004, Released: Sep. 2, 2004. 118 pages.

McHenry et al. "Spectrum Occupancy Measurements, Location 1 of 6: Riverbend Park, Great Falls, Virginia," Shared Spectrum Company Report, Aug. 2005. 55 pages.

McHenry et al. "Spectrum Occupancy Measurements, Location 2 of 6: Tyson's Square Center, Vienna, Virginia, Apr. 9, 2004," Shared Spectrum Company Report, Aug. 2005. 52 pages.

McHenry et al. "Spectrum Occupancy Measurements, Location 3 of 6: National Science Foundation Building Roof, Apr. 16, 2004, Revision 2," Shared Spectrum Company Report, Aug. 2005. 47 pages.

McHenry et al. "Spectrum Occupancy Measurements, Location 4 of 6: Republican National Convention, New York City, New York, Aug. 30-Sep. 3, 2004, Revision 2," Shared Spectrum Company Report, Aug. 2005. 109 pages.

McHenry et al. "Spectrum Occupancy Measurements, Location 5 of 6: National Radio Astronomy Observatory (NRAO), Green Bank, West Virginia, Oct. 10-11, 2004, Revision 3," Shared Spectrum Company Report, Aug. 2005. 36 pages.

McHenry et al. "Spectrum Occupancy Measurements, Location 6 of 6: Shared Spectrum Building Roof, Vienna, Virginia, Dec. 15-16, 2004," Shared Spectrum Company Report, Aug. 2005. 39 pages.

* cited by examiner

DYNAMIC SPECTRUM ALLOCATION AND ACCESS FOR USER DEVICE

This Application claims the benefit of priority to U.S. Provisional Application Ser. No. 61/024,714, entitled "DYNAMIC SPECTRUM ALLOCATION AND ACCESS," filed on Jan. 30, 2008, the entire disclosure of which is incorporated herein by reference.

TECHNICAL FIELD

This document relates to electromagnetic spectrum allocation and access.

BACKGROUND

The electromagnetic spectrum can be viewed as a natural resource that is potentially available for an unlimited number of users and uses. Unfortunately, much of the electromagnetic spectrum lies fallow due to "command-and-control" regulatory policies that impede investments by new entrants and innovative new uses of the spectrum. These regulatory policies are typically not market-driven and are thus not responsive to economic signals and the public interest. As a result, many regulatory policies tend to lock in incumbent users and uses for the spectrum, impeding innovation and efficiency.

SUMMARY

This specification describes mechanisms and techniques by which portions of the electromagnetic spectrum may be allocated to various users, such as users of mobile devices that want to transmit or receive information wirelessly. For example, an organization having control of a spectrum band may allocate that spectrum according to dynamic bidding systems, where devices seeking access to the spectrum may submit bids to a central controller of the spectrum. When there is little use of the spectrum, the spectrum can be made available for free to all corners, or for free to subscribers and at a nominal rate to non-subscribers. When there is much more use of the spectrum (e.g., when the available access to the spectrum is nearing saturation) in a particular area, the spectrum may be allocated to devices in the area according to various allocation formulas, which may include dynamic auctioning of usage rights for the spectrum. For example, subscribers (e.g., licensees of spectrum access) may still be allowed usage at a standard level for free, but non-subscribers may be required to pay some fee for a license to access the spectrum.

For example, a central clearinghouse may monitor the level of load over the spectrum and may, in response to a request for access from a wireless device, propose a rate at which access will be granted, given the current load and the level of access that is sought (e.g., the device may request certain throughput or power levels that will occupy larger levels of capacity for a particular access point and for the network in general). The device, either automatically (e.g., using internal rules established by a user) or manually, may accept the price and be granted access pursuant to agreed upon parameters (e.g., time of access, bandwidth, and power). The clearinghouse may then cause an account associated with the device to be charged for the access.

Alternatively, the central clearinghouse may receive requests for access from wireless devices, and each request may include a corresponding bid. Access to the spectrum may be awarded to the devices based on the received bids. The clearinghouse may then cause accounts associated with the devices to be charged for the access at the accepted bids.

In general, one aspect of the subject matter described in this specification can be embodied in methods for granting access requests to a spectrum band. The methods include the actions of defining access allocations to a spectrum band; defining transmit rights to the access allocations; receiving requests for transmit rights; prioritizing the requests according to a dynamic market priority; and granting the requests for transmit rights to one or more of the access allocations to the spectrum band according to the dynamic market prioritization of the requests. Other embodiments of this aspect include corresponding systems, apparatus, and computer program products.

Another aspect of the subject matter described in this specification can be embodied in methods for auctioning access allocations to a spectrum. The methods include the actions of defining access allocations to a spectrum band; defining transmit rights to the access allocations; receiving real-time auction bids for the transmit rights; and awarding in real-time the transmit rights based on the real-time auction bids. Other embodiments of this aspect include corresponding systems, apparatus, and computer program products.

Another aspect of the subject matter described in this specification can be embodied in methods for requesting access to a spectrum band. The methods include the actions of transmitting a bid for an auction of an access allocation to a spectrum access manager; determining, in response to the transmitted bid, whether a right to transmit data over the access allocation is granted; if a right to transmit data over the access allocation is not granted, then: iteratively incrementing the bid for the auction of an access allocation and transmitting the bid to the spectrum access manager and determining, in response each transmitted bid, whether a right to transmit data over the access allocation is granted or whether the bid exceeds a maximum bid; and continuing to iteratively increment the bid and transmit the bid until a positive determination of one of a right to transmit data over the access allocation is granted or the bid exceeds a maximum bid. Other embodiments of this aspect include corresponding systems, apparatus, and computer program products.

Another aspect of the subject matter described in this specification can be embodied in a system for managing access allocations to a spectrum band. The system includes a transmit rights manager engine that defines access allocations to a spectrum band and defines transmit rights to the access allocations. The system also includes a request manager engine that receives real-time requests for transmit rights to one or more access allocations to the spectrum band, prioritizes the requests according to a dynamic market priority, and grants in real-time the requests for transmit rights according to the dynamic market prioritization of the requests.

Another aspect of the subject matter described in this specification can be embodied in a communication device that includes a communication subsystem, a processing subsystem, and a data store. The communication subsystem transmits and receives data over the spectrum band. The processing subsystem processes data received over the communication subsystem and processes data for transmission over the communication subsystem. The data store stores instructions executable by the processing subsystem, and that upon such execution causes the processing subsystem and the communication subsystem perform the operations of: transmitting a bid for an auction of an access allocation to a spectrum access manager; determining, in response to the transmitted bid, whether a right to transmit data over the access allocation is granted; if a right to transmit data over the access allocation is not granted, then: iteratively incrementing the bid for the auction of an access allocation and transmitting the bid to the spectrum access manager and determining, in response each transmitted bid, whether a right to transmit data over the access allocation is granted or whether the bid exceeds a maximum bid; and continuing iteratively incrementing the bid and transmitting the bid until a positive determination of one of a right to transmit data over the access allocation is granted or the bid exceeds a maximum bid.

Various optional advantages and features can be realized by the subject matter described in this specification. Market-driven allocation can increase useful spectrum occupancy by awarding access to those that value such access the most. Power utilization can be optimized to require as little power as necessary to efficiently communicate, and can be further optimized by taking advantage of existing wired infrastructure. Furthermore, open access can be provided on a non-discriminatory basis, and infrastructure build out can be financed, in part, by users who value access to the infrastructure the most. These various optional advantages and features can be separately realized and need not be present in any particular implementation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Introduction

Figure 1B:
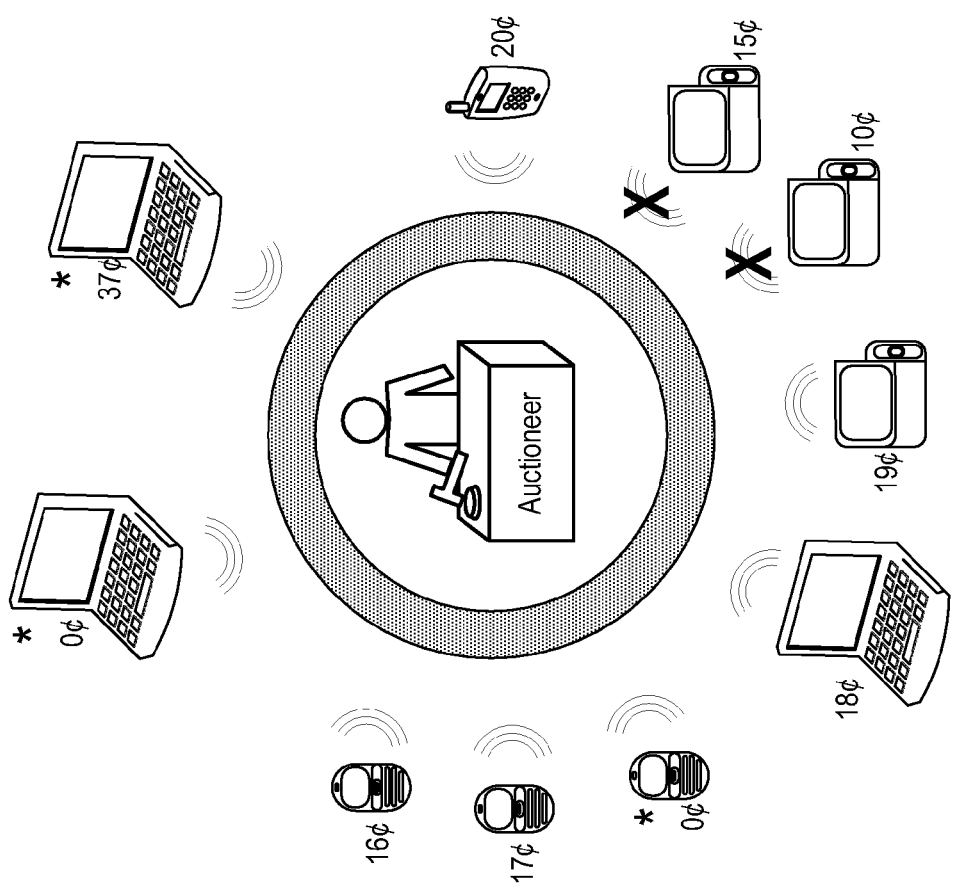
FIGS. 1A and 1B are conceptual diagrams of a spectrum access system.
Figure 1A:
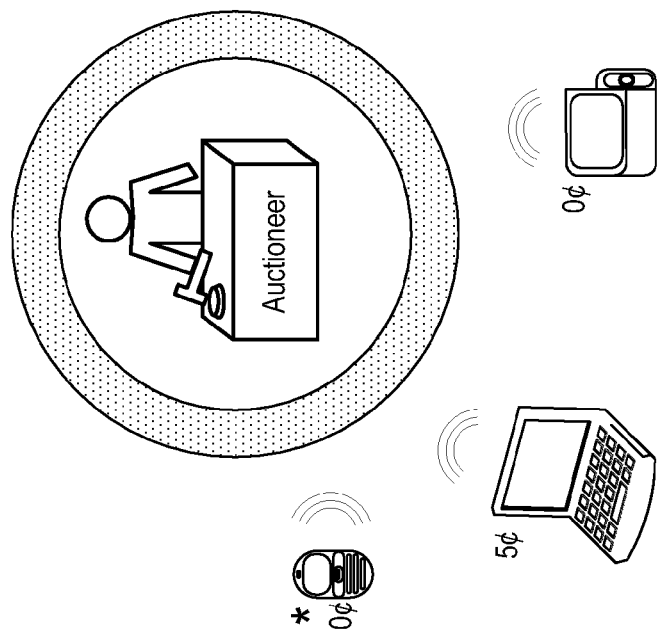

FIGS. 1A and 1B are conceptual diagrams of a spectrum access system. These figures show, in a general manner, concepts that are discussed in more detail below. The representations in the two figures show multiple wireless devices, such as smart phones, wireless data devices, and laptop computers that are seeking wireless data connections in a particular area. The devices are each vying for the same spectrum bandwidth, i.e., seeking wireless communication access.

The spectrum bandwidth in each figure is represented by the circular band surrounding an auctioneer. The auctioneer, in turn, may represent a network component for allocating, controlling, and billing for access over the spectrum. The image of an auctioneer is meant to represent a particular implementation, which is discussed below, in which devices attempting to use bandwidth may be given the options to opt in if they accept a particular price for access, or provide a particular bid for access. Other allocation processes, however, can also be used.

In FIG. 1A, there is little activity in the particular area, as indicated by the lightly shaded circular band representing the spectrum. The low level of activity could be due to the area being a rural area with little wireless access demand, or due to the time of day, such as a time in the early morning during which there is less wireless activity. In this particular example, the organization controlling the access has agreed to give free access to all comers under certain circumstances, such as when the bandwidth in a particular area is largely unused and is not expected to become heavily used in the near future. As shown, three devices are seeking wireless access over the spectrum. Devices that are subscribers to a license to access the spectrum (e.g., devices for which a periodic or lifetime license fee is paid) are shown marked with an asterisk. In the example of FIG. 1A, the one device that is a subscriber can access the spectrum for free (0 cents), as can a non-subscriber device.

Free spectrum access can be capped for non-subscribers and for subscribers. The cap can be based on a one or more conditions, such as maximum power conditions, time period conditions, and data transfer conditions, to name just a few. For example, the laptop has been charged 5 cents for access because, when it checked with the clearinghouse about access rights, the laptop reported that it was planning to send a large file over the network for an extended period of time. As a result, the clearinghouse was not willing to provide free access, lest that transfer prevent other subscribers or non-subscribers from having free access at a more appropriate level.

In FIG. 1B, the bandwidth in the particular area has filled up substantially with spectrum traffic, as indicated by the darkly shaded circular band representing the spectrum. Perhaps the area shown in FIG. 1B is an urban area while the area in FIG. 1A is a rural area, or perhaps the two figures show the same geographic area but at different times, e.g., with FIG. 1B representing a morning period in which many people are reading web sites and checking e-mails.

As a result of the increasing demand, the parameters for access have now changed, and the access authorization is allocated in a dynamic manner, e.g., access is provided pursuant to an auction of rights to transmit over the spectrum. The original subscriber telephone can still have access at a nominal level for free, as guaranteed by the subscriber license. Additionally, other license subscribers have gained access to the spectrum, as indicated by other devices denoted by an asterisk, and likewise have free access. One of the licensed subscribers, however, is seeking additional service demands that are not included with the subscriber license, e.g., additional radiated power demands, and is thus being asked to accept a license access price of 37 cents. That price can be lower than it would be for a non-subscriber seeking the same level of access.

Note that some of the devices are denied access, as indicated by a superimposed "X" over the radio signal representations. Those devices are denied access because they submitted auction bids that were lower than other devices also bidding for access to the spectrum. For example, the auction system may have determined that a minimum price for access given the demand is 16¢; or may have determined that the spectrum is fully utilized and that access will only be provided to the highest bidders when access becomes available. The devices that were denied access may not have submitted higher bids for a variety of reasons. For example, the users of the devices may have specified maximum bids of 10 cents and 15 cents; or may have decided to delay access to the spectrum until later (e.g., perhaps they decided to continue composing a document offline, or delayed a planned on-line game); or were simply outbid at the time all access to the spectrum was allocated; etc.

Other various arrangements for providing access to a network may also be provided, including particular examples discussed below. Pricing for access may take a variety of forms such as pricing per unit of transmitted data or per unit of access time, even though particular single set prices are shown in this example. Various other mechanisms for managing network access may also be employed as well, and such other mechanisms may allocate access independent of price.

Figure 1C:
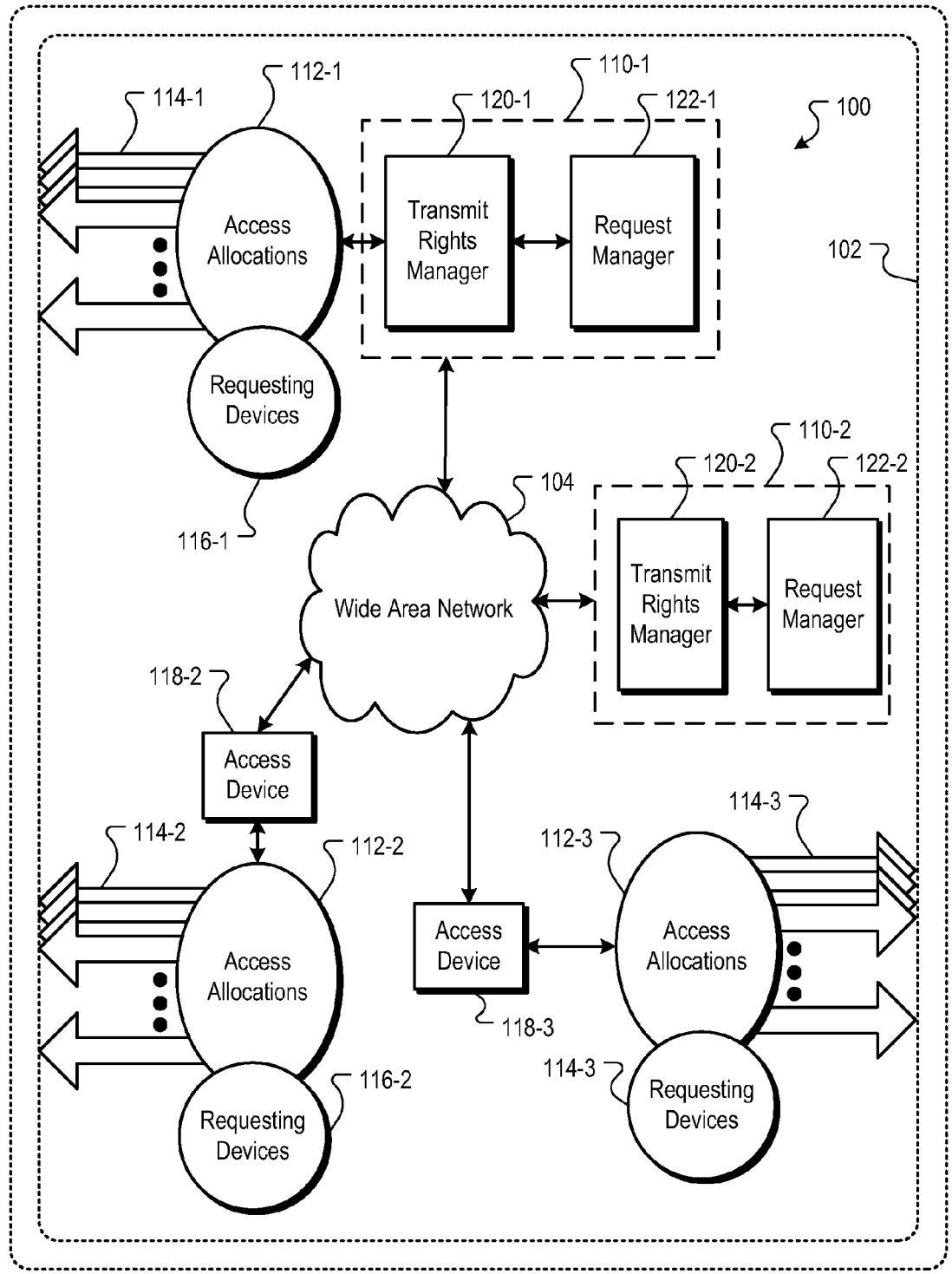
FIG. 1C is a block diagram of a system for managing access to a spectrum.

FIG. 1C is a block diagram of a system 100 for managing access to a spectrum 102. The system 100 implements an open spectrum access policy that grants transmit rights, i.e., rights that include the right to transmit data over the spectrum 102, according to a dynamic market prioritization. In some implementations, open access can be provided to the spectrum 102 by, for example, a regulatory body, e.g., a governmental entity, or one or more non-regulatory bodies, e.g., one or more business entities that provide spectrum warehousing.

§1.1 Dynamic Spectrum Allocation Overview

In some implementations, the dynamic market prioritization can include an auction prioritization in which transmit rights are awarded on an as-needed basis in response to auction bids from user devices. Other prioritization schemes can also be included, such as a per-device license fee in which transmit rights are provided to a user device for a license period, e.g., monthly, yearly, a device lifetime, etc.

An example auction prioritization can be a real-time auction. In such a real-time auction, devices provide bids for access to a spectrum band at the time the access is needed by the device, e.g., when a user of the device desires to send an e-mail message over a wireless link. The devices requesting access to a spectrum band can be awarded rights to transmit an amount of power for a unit of time according to the auction. In some implementations, the transmit rights can be allocated over an entire continuous band, e.g., the devices may transmit and receive data according to a code division multiple access (CDMA) protocol over a spectrum band having a lower limit of substantially 698 MHz and an upper limit of substantially 806 MHz. Such allocation over an entire band can increase the service capacity for user devices, as overall capacity increases with band allocation. Other bands can be used, and these other bands may constitute a continuous band or may constitute a collection of discontinuous bands.

In variations of these implementations, the transmit rights can be limited to a specified power cap that is based on an ambient power level. Because the amount of power transmitted is proportional to a service area over which a transmitting device interferes, an allocation cost can be based on a power transmission level. Furthermore, in many communication protocols, an ambient power level in a service area can be indicative of a level of congestion. For example, a CDMA system can support a finite number of users before interference and noise power density received at an access device, such as a base station, results in unacceptable communication errors. Because CDMA devices transmit using the same frequency band at the same time, each device's communication interferes with the communications of other devices. As each device increases its transmit power, the other devices may react by raising their transmit powers, creating additional interference. Thus the specified power cap can be used to reduce interference and to maximize the number of access allocations available for a given service area.

An example per-device license fee can be a one-time license fee, e.g., a fee included in the cost of the device that allows unlimited use at one or more specified power levels. In some implementations, transmit rights can be awarded based on a combination of the per-device license fee and auction prioritization. For example, a user may purchase a device and pay a license fee for a lifetime transmit right up to a specified power level. The right to transmit at power levels in excess of the specified power level, however, may only be obtained by participating in an auction for such a transmit right.

In some implementations, the device can implement collision detection and back-off features. For example, a collision detection and back-off scheme similar to the 802.11g Wi-Fi protocol can be used, with the physical layers adapted to communicate over the managed spectrum band.

§2.0 Example System Architecture and Operation

In some implementations, the system 100 includes one or more spectrum access managers 110, e.g., 110-1 and 110-2. In one implementation, a spectrum access manager 110-1 can define access allocations 112-1 to a spectrum band in a local service area, e.g., a wireless "hot spot," or one or more larger service areas, such as several wireless hot spots, or even a metropolitan area. Example access allocation 112 can include CDMA channels, or other communication protocol channels, e.g., frequency division multiple access (FDMA) channels in the spectrum 102, time division slices in a time division multiple access (TDMA) communication protocol, orthogonal frequency-division multiplexing (OFDM), frequency hopping channels, etc.

The spectrum access manager 110-1 can further define transmit rights 114-1 for the access allocations 112-1. In some implementations, the transmit rights 114-1 can be a right to transmit over one or more of the access allocations 112-1. The transmit rights 114-1 can, for example, define a right to transmit a unit of power over the spectrum band 102. Requesting devices 116-1, e.g., communication devices such as mobile phones, wireless-enabled computer devices, mobile e-mail devices, etc., can transmit requests for transmit rights to the spectrum access manager 110-1.

§2.1 Processing Spectrum Access Requests

In some implementations, the requests from the requesting devices 116-1 can be auction bids for an auction of the transmit rights 114-1 to the access allocations 112-1 to the spectrum band 102. Furthermore, the bids for the requesting devices 116-1 can be grouped according to congestion data, e.g., ambient power levels in which the requesting devices are operating. By grouping the bids according to ambient power levels, each user is bidding against other users with similar power demands. Accordingly, users that most value access to the spectrum will gain such access.

For example, the spectrum access manager 110-1 may include an access device that can determine an ambient power level of the spectrum band 102 in the service area, such as a wireless access point, or may communicate with a plurality of such access devices in different service areas. Alternatively, each requesting device 116 can include a sensed power level with each request so that the bids for access allocations 114 can be grouped based on the ambient power levels. The received bids are grouped according to their respective power levels so that competing bids are evaluated based on similar market demands. Such grouping can facilitate market equality so that users having similar demands and needs bid against each other. For example, bids received from relatively congested service areas will compete against each other, while bids received from relatively uncongested service areas will compete against each other.

Other techniques for determining bidding groups can also be used. For example, quality of service (QoS) measures received from each device 116 can be used; error correcting coding rates or error rates received from each device can be used; etc.

In some implementations, transmit rights 114-1 can be grouped according to ambient power levels. For example, several power levels in service areas can be used to group available transmit rights. As with the grouping of received bids, the grouping of transmit rights facilities market equality and provides spectrum access to user that attribute the most value to such access.

In other implementations, the spectrum access requests and/or transmit rights may not be grouped according to congestion measures, and access is awarded according to the bid values.

§2.2 Bidding and Auction Models

In some implementations, each requesting device 116 may transmit an initial bid of $0.00, or an initial bid of a nominal minimum bid, to the spectrum access manager 110-1. The spectrum access manager 110-1, in turn, will grant transmit rights 114-1 according to the bids received, with the granting of the transmit rights 114-1 being prioritized according to the bids received. Each requesting device will receive data in response to the initial bid indicating whether a right to transmit data over an access allocation 112 has been granted. In response, each requesting device 116 that has not been awarded a transmit right can iteratively increment a bid for an auction of an access allocation 114 and transmit the bid to the spectrum access manager 110-1.

In some implementations, a requesting device 116 can determine, in response each transmitted bid, whether the incremented bid exceeds a maximum bid. The requesting device 116 can continue to iteratively increment the bid and transmit the bid until a positive determination of one of a right to transmit data over the access allocation is granted or the bid exceeds a maximum bid. The maximum bid can, for example, be set by a user of the requesting device 116.

In some implementations, the requesting devices 116-1 can transmit to the spectrum auction manager 110 auction bids that define maximum bids for transmit rights 114-1 to access allocations 112-1. Based on the maximum bids, the spectrum auction manager 110 can, in turn, award transmit rights to the requesting devices 116-1 for any amount that is less than or equal to the maximum bids. For each device 116, the maximum bid can be selected by a user of the device 116.

Various real-time auction types can be used, such as English auctions, Vickrey-type auctions, or other auction types that can facilitate the receiving and processing of multiple bids for one or more transmit rights 114-1. The requests can thus be prioritized according to a dynamic market priority, e.g., prioritized according to the auction bids and/or service area demand, e.g., congestion levels. Thus, the cost for access to the spectrum 102 may increase during periods of high congestion, and may decrease during periods of low congestion. Furthermore, during periods of high congestion, access to the spectrum 102 is provided to users that place the highest value on such access.

In some implementations, the cost for the transmit rights 114-1 may vary significantly over time. For example, a combination of the number of requesting devices and other conditions, e.g., weather conditions, scattering, etc., may cause the fluctuations in the number of access allocations 112-1 available. Accordingly, the spectrum access manager 110-1 can further define transmit rights 114-1 to transmit over the spectrum band 102 for a unit of time, e.g., 1 second, 10 seconds, 1 minute, etc. For example, at a given power level (congestion level), one requesting device 116 may secure a 10 second transmit right for 1 mil (i.e., $0.001); after the transmit right has expired, the ambient power level may have increased, and thus the requesting device 116 may secure another 10 second transmit right for 1.5 mils.

In some implementations, requesting devices 116-1 for which an associated per-device license fee has been paid may receive an allocated transmit right 114. A request for an allocated transmit right is prioritized above auction requests so that that a transmit right is always provided regardless of current auction prices for transmit rights. Accordingly, the spectrum access manager 110-1 can determine if the request from a requesting device 116 is for an allocated device transmit right. If so, then the spectrum access manager 110-1 can automatically grant the request for a transmit right 114 to an access allocation 112. The allocate transmit right 114 can be in effect for the duration of the per-device license fee, e.g., a day, a week, a month, or even a device lifetime.

§2.3 Predefined Access Allocations and Transmit Rights

In other implementations, the number of transmit rights 114 and access allocations 112 can be set to a maximum value, e.g., N, and a remaining power allocation of the spectrum 102 can be reserved for other uses. An auction model may be implemented based on the utilization of the allocations. For example, if a service area provides N access allocation and M access allocations are currently being used, where M<N, then an auction price may be waived, e.g., the transmit rights 114-1 may be freely distributed, such as by award to bids of $0.00, or some nominal value, e.g., $0.01 per minute. Conversely, if M>N, then an auction price may be determined by incremental bids received from requesting devices 116-1. For example, in some implementations, each requesting device 116 may transmit an initial bid of $0.00 to the spectrum access manager 110-1. If M>N, then bids will be awarded only for non-zero values. Each requesting device will receive data in response to the initial bid indicating that a right to transmit data over an access allocation 112 has not been granted. In response, each requesting device 116 can iteratively increment a bid for an auction of an access allocation 112 and transmit the bid to the spectrum access manager 110-1. The spectrum access manager 110-1, in turn, will grant transmit rights 114-1 according to the bids received, with the granting of the transmit rights 114-1 being prioritized to the highest bids received.

§2.4 Spectrum Allocation Infrastructure

To facilitate the wireless auction and access requests, a portion of available power or channels in each service area can be reserved. The amount of data required for the auction is relatively small. In some implementations, the auction can be facilitated over a collision detection and back-off protocol at a low data rate that requires a small amount of reserved power.

In some implementations, the spectrum access manager 110-1 can include a transmit rights manager 120-1 and a request manager 122-1. The transmit rights manager 120-1 can, for example, define access allocation 112-1 to the spectrum band and define transmit rights 114-1 to the access allocations. For example, the transmit rights manager 120-1 can define a plurality of CDMA channels and transmit rights to each channel, such as a right to transmit up to a maximum power cap during a unit time.

The request manager 122-1 can receive requests for transmit rights 114-1 to the access allocations 112-1 and grant the transmit rights 114-1 to the requesting devices 116-1 in response. For example, the request manager 122-1 can receive real-time requests for transmit rights 114-1 to one or more access allocations 112-1, prioritize the requests according to a dynamic market priority, such as an auction, and grant the requests for transmit rights 114-1 to the requesting devices 116-1 according to the dynamic market prioritization of the requests.

The transmit rights manager 120-1 and a request manager 122-1 can be realized by instructions that upon execution cause one or more processing devices to carry out the processes and functions described above. Such instructions can, for example, comprise interpreted instructions or executable code, or other instructions stored in a computer readable medium. The transmit rights manager 120-1 and the request manager 122-1 can be implemented separately, or can be implemented as a single software entity, e.g., as the spectrum access manager 110-1. The transmit rights manager 120-1 and the request manager 122-1 can also be distributively implemented over a network, such as a server farm, or can be implemented in a single computer device. Other system architectures can also be used.

§2.5 Multiple Service Area Request Processing

In some implementations, a spectrum access manager 110-2 can manage spectrum access to the spectrum band 102 for several or more different locations or service areas. For example, the spectrum access manager 110-2 can communicate with a first access device 118-2 through a wide area network 104, such as the Internet, to manage access allocations 112-2 and transmit rights 114-2 for requesting devices 116-2 at a first location, e.g., a first city. Likewise, the spectrum access manager 110-2 can communicate with a second access device 118-3 through the wide area network 104 to manage access allocations 112-3 and transmit rights 114-3 for requesting devices 116-3 at a second location, e.g., a second city.

In some implementations, congestion data can be collected by the spectrum access manager 110-2. Such congestion data can include, for example, ambient power level quantized to a unit of power, e.g., 10 milliWatts, and/or the number of access allocations 112 and transmit rights 114 available, as described above. Furthermore, the bids for the requesting devices 116-2 and 116-3 and/or the transmit rights 114-2 and 114-3 can be grouped according to the congestion data.

Although only two access devices 118 are shown, hundreds or even thousands of access devices 118 can communicate with the spectrum access manager 120. Example access devices can include network gateway, access points, wireless network access devices, or any other device that can provide access to the wide area network 104.

§3.0 Example Operating Environment

Figure 2:
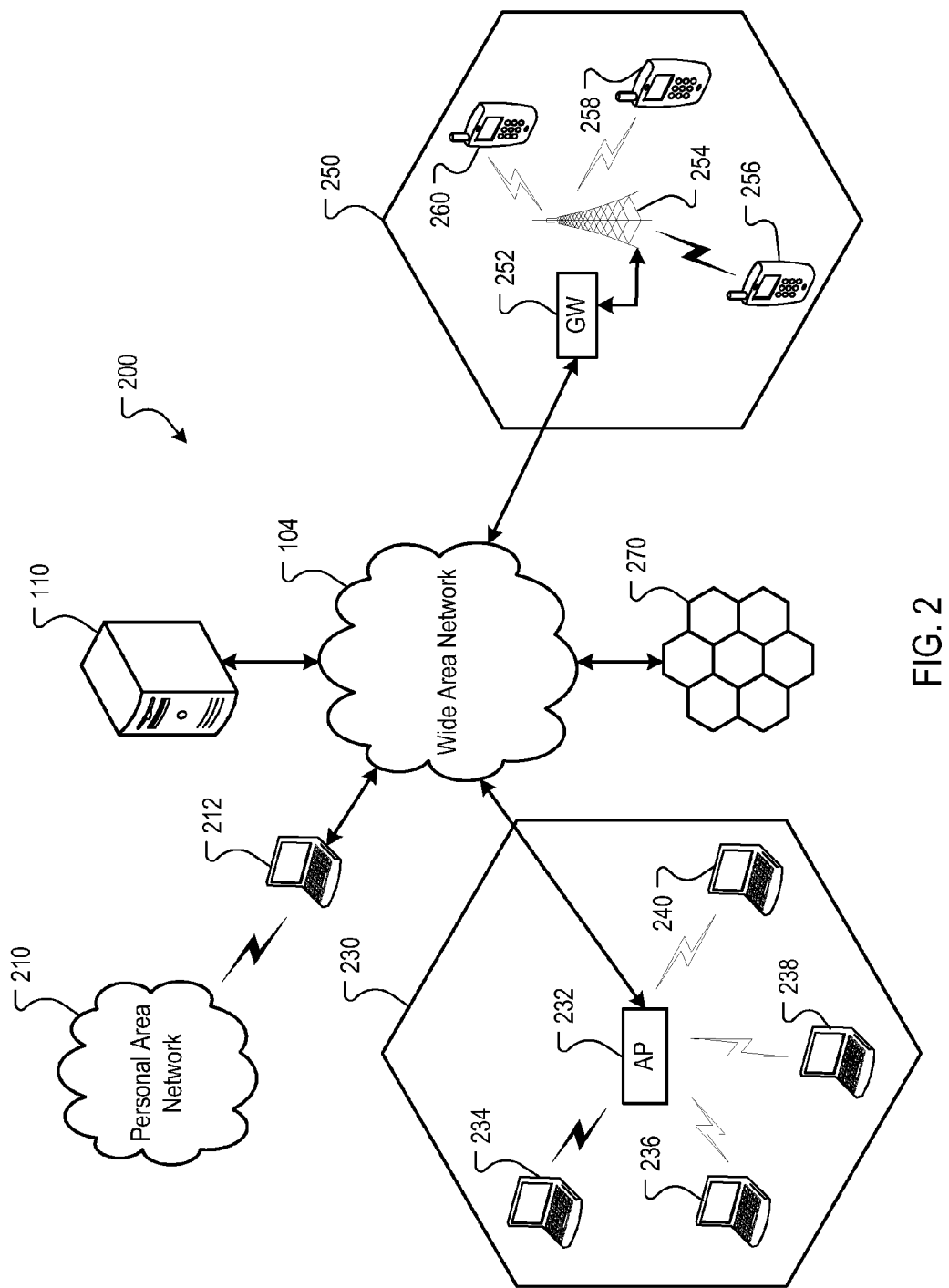
FIG. 2 is a block diagram of environment in which the system of FIG. 1C can be implemented.

FIG. 2 is a block diagram of environment 200 in which the system 100 of FIG. 1C can be implemented. As shown in FIG. 2, a spectrum access manger 110 receives information related to communication device access to a spectrum from a variety of service areas, e.g., service areas 210, 230, 250 and 270. Although the spectrum access manager 110 is depicted as a single computer device, the spectrum access manager 110 can be distributively implemented over multiple server devices communicating over a network.

Each of the service areas 210, 230, 250 and 270 can employ different communication protocols, i.e., the spectrum access manager 110 can support different types of access allocations 112. For example, the service area 210 may include a personal area network that is defined by peer-to-peer, low power communications. In some implementations, the personal area network 210 can employ a direct sequence, spread spectrum frequency hopping protocol. Other communication protocols can also be used.

Devices on the personal area network 210 can, for example, communicate with the spectrum access manger 210 through a wireless enable computer device 212. For example, each device in the personal area network 210 can submit bids to the spectrum access manger 210 and obtain corresponding transmit rights 114 to access allocations 112.

In some implementations, devices that establish and communicate over a personal area network 210 can include a per-device license fee in the purchase price. Because such devices are typically low power communication devices and interfere over small service areas, e.g., 10 meters or less, such devices will often not compete for access to the spectrum. Accordingly, in some implementations, the personal area network can be established over allocated transmit rights, as indicated by the darkened wireless link.

The service area 230 can, for example, include one or more wireless network hot-spots. For example, the wireless network can be established by an access device, such as a wireless access point 232. Computer devices 234, 236, 238 and 240 can access the wide area network 104 though the access point 232. In some implementations, transmit rights to access allocations can be prioritized according to per-device licenses and bids. For example, the computer device 234 may include a wireless network interface card that has an associated lifetime license. Accordingly, the computer device 234 may establish communications with the wide area network 104 over an allocated transmit right, as indicated by the darkened wireless link.

Conversely, the computer devices 236, 238 and 240 may only transmit data over the spectrum after being allocated a transmit right in response to one or more bids. Thus, the computer devices 236, 238 and 240 transmit data only after being awarded auctioned transmit rights, as indicated by the wire frame wireless links.

Access to other service areas and protocols can also be facilitated. For example, the service area 250 can be defined by a cellular network that includes a gateway 252 and one or more base stations 254. Cellular communication devices 256, 258 and 260 can communicate over the spectrum either by a secured allocated transmit right or by securing auctioned transmit rights. Any number of communication protocols can be used to establish the service area 250. In some implementation, a CDMA protocol is used.

In addition to access to the three service areas 210, 230 and 250 shown, access other service areas 270 can also be facilitated by the spectrum access manager 110. The other service areas 270 can be established by any communication protocols that can transmit and receive data over the spectrum band or bands managed by the spectrum access manager 110. Additionally, the service areas can be geographically distributed over many areas, e.g., across a country or even across continents.

§4.0 Example Access Request System

Figure 3:
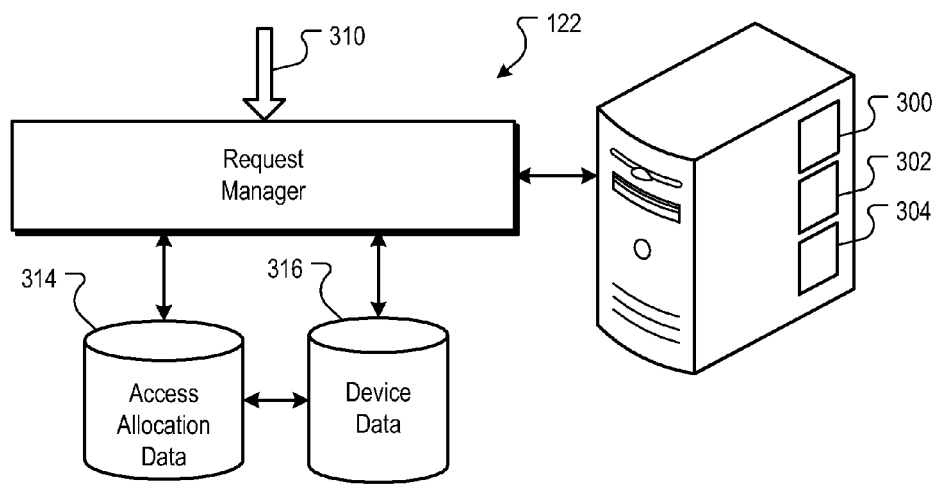
FIG. 3 is a block diagram of a request manager for auctioning access to a spectrum.

FIG. 3 is a block diagram of a request manager 122 for auctioning access to a spectrum. In some implementations, the request manager 122 can be implemented in one or more server computer devices that include a communication subsystem 300, a processing subsystem 302, and a data store 304. The communication subsystem 300 can transmit and receive data over a wide area network, and the processing subsystem 302 can process data received over the communication subsystem and provide data for transmission over the communication subsystem to the wide area network.

The data store 306 can store instructions executable by the processing subsystem 302. Upon such execution, the processing subsystem 302 can manage access to the spectrum according to a dynamic market priority. For example, in some implementations, the processing subsystem 302 can receive bids from communication devices, auction the access allocations according to the bids, and transmit to the communication devices data indicating whether rights to transmit data over the access allocations are granted.

In some implementations, the request manager 122 can implement a Vickrey-style auction, e.g., a $k+1^{st}$ price auction where k is the capacity of the system. For example, in some implementations, the request manager 122 can receive requests 310 that define a maximum amount a bidding device is willing to pay for a transmit right, and each device may incur a charge for a transmit right that is equal to the bid of the next-highest bid. Thus, if devices A, B, and C bid maximum cost-per-transmit right of $0.005, $0.0075, and $0.01, respectively, and only two transmit rights are available, then the device C will incur a charge of $0.0075 for a transmit right, and device B will incur a charge of 0.005 for a transmit right.

In some implementations, for a number p of ambient power level groups, each power level group having a capacity of $k_p$, each power level group can implement a $k_p+1^{st}$ price auction. Other auctions and optional auction band allocations can also be used.

In other implementations, the request manager 122 can receive requests 310 that define increasing incremental bids from communication devices up to a maximum bid for each communication device. The incremental bids can be processed according to a Vickrey-style auction, or any other appropriate auction scheme.

In other implementations, the request manager 122 can receive requests 310 that define requests for allocated transmit rights, e.g., a transmit right associated with a per-device license fee. Such requests for allocated transmit rights can be prioritized above all bids so that available transmit rights are granted to devices for which a license is in effect.

In some implementations, access allocation data 314 and device data 316 for managing communication device accounts can be stored in the data store 304. The requests 310 can include device identifying data, e.g., a user account number, or a unique media access control (MAC) address number associated with a user account, or some other identifying data. A user account associated with a device can thus be identified by comparing the identifying data to the device data 316. The user accounts can specify whether the device has an associated allocation transmit right, or whether the device is associated with an account in good standing. For example, a user may accrue account charges for securing transmit rights on a monthly basis, and as long as the account balance is in good standing, e.g., not more than 90 days past due, the requests 310 received from devices associated with the account may be submitted for auction. Alternatively, a user may pay for spectrum access in advance. Accordingly, as long as the account balance is greater than any pending bid for an associated communication device, the requests 310 associated with the account may be submitted for auction.

§5.0 Example Communication Device

Figure 4:
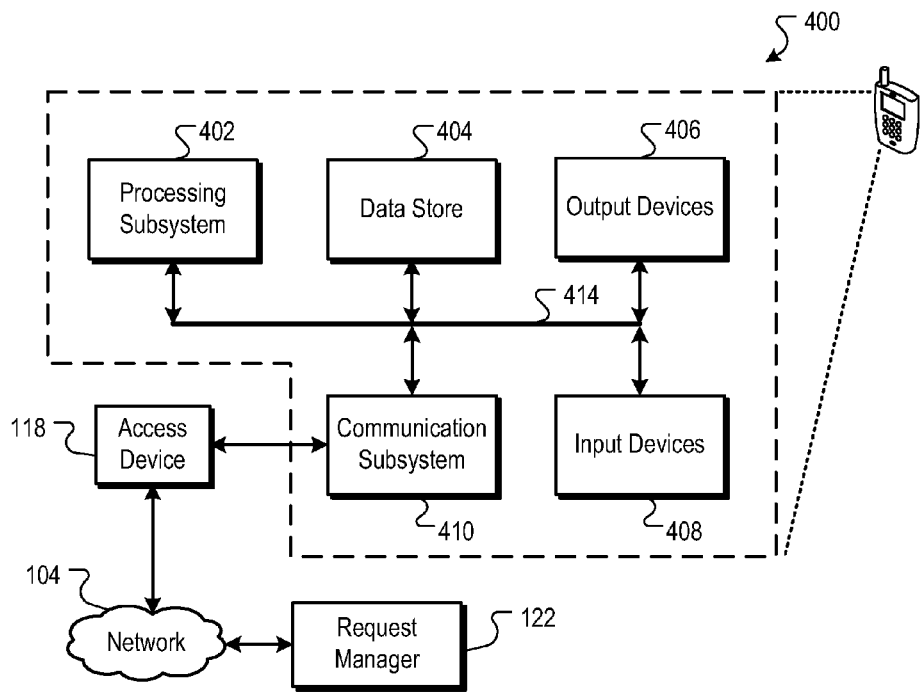
FIG. 4 is a block diagram of a user device that can bid for an access allocation to a spectrum.

FIG. 4 is a block diagram of a user device 400 that can bid for an access allocation to a spectrum. The example device 400 can be used to implement the requesting devices 116 of FIG. 1C, and includes a processing subsystem 402, a data store 404, output devices 406, input devices 408 and a communication subsystem 410. A bus system 414, including, for example, a data bus and a motherboard, can be used to establish and control data communication between the components 402, 404, 406, 408 and 410. Example user devices can include mobile communication devices, such as cell phones or wireless Internet devices, computer devices with wireless network interface cards, etc. Other system architectures, however, can also be used.

The processing subsystem 402 can, for example, include one or more microprocessors. The data store 404 can, for example, include a random access memory storage device, such as a dynamic random access memory; and/or a persistent memory subsystem, such as a flash memory or a hard drive; and/or other types of computer readable medium memory devices. The data store 404 can store instructions that are executable by the processing subsystem 402. Example output devices 406 can include a display device, such as a screen, and an audio device, such as a speaker, etc. Example input devices 408 can include a keyboard, a mouse, a stylus, etc.

The communication subsystem 412 can, for example, include wireless communication device operable to communicate data to and from the wide area network 104 through an access device 118. Example access devices can include mobile device base stations, access points, wireless routers, etc.

As described above, the cost for transmit rights to the spectrum can be determined dynamically, and can be based on congestion levels in service areas. To secure transmit rights to access allocations, the device 400 can be configured to request spectrum access by one or more schemes, e.g., the device 400 can request spectrum on an as-needed basis by auction bids, or can request spectrum access pursuant to allocated transmit right secured by a per-device license fee.

§5.1 Maximum Bidding

In some implementations, the device 400 can transmit to the spectrum access manager 110 an auction bid that defines a maximum bid for a transmit right to an access allocation. Based on the maximum bid, spectrum access manager 110, in turn, award one or more transmit rights to the device 400 for any amount that is less than or equal to the maximum bid. The maximum bid can be selected by a user, and the maximum bid may be stored in the data store 404 of the device 400.

For example, a user of the device 400 may specify a maximum bid of $0.01 for a 1-minute transmit right. Depending on the congestion and competing bids, the spectrum access manager 100 may award transmit rights at a price less than $0.01, or may not award any transmit rights. For example, if there are no contentions for access allocations, then the spectrum access manager 110 may freely award transmit rights, or may award the transmit rights for a nominal fee, e.g., $0.001 per one-minute transmit right. Conversely, if there are contentions for access allocation, e.g., there are more devices in a service area than there are available access allocations, then the spectrum access manager 110 may award transmit rights according to received bids. Thus, if enough other users in the same service area value the transmit rights more than the user of the device 400, then the device 400 may not be awarded a transmit right, as the user of the device 400 is outbid by users of other devices.

§5.2 Incremental Bidding

In some implementations, the device 400 can transmit increasing incremental bids up to a maximum bid amount. In some implementations, the device 400 can transmit an initial bid of $0.00, and each incremental bid can be incremented by a minimum incremental amount, e.g., 1 mil., 1 cent, etc.

After transmitting each incremental bid, the device 400 can wait to receive data from the spectrum access manager 100 that indicates whether right to transmit data over the access allocation is granted. In response each transmitted bid, the device 400 can thereafter determine whether a right to transmit data over the access allocation is granted or whether the bid exceeds a maximum bid. If the incremental bid exceeds a maximum bid, the device 400 can be precluded from participating in the auction.

§5.3 Access Preferences

As the cost for transmit rights to the spectrum may vary over time, users may desire spending information related to the cost of spectrum access. In some implementations, the device 400 can provide incremental spending values to the user. The incremental spending values can, for example, relate to a current cost of a transmit right currently in use; or can be an accumulated cost for a communication session that requires many transmit rights; or can be some other expenditure value from which the user may ascertain a spectrum access cost.

In some implementations, an allocation bid total can be stored in the data store 404, e.g., an amount the user of the device 400 is willing to spend over a period. For each bid that that results in a granting of a transmit right, the bid value can be subtracted from the allocation bid total. Upon depletion of the allocation bid total, e.g., upon the allocation bid total being less than a bid required to secure a transmit right, the device 400 can cease participating in the auction.

In other implementations, a user may purchase a device 400 and pay a license fee for a transmit right up to a specified power level for a period, e.g., yearly or lifetime. The right to transmit at power levels in excess of the specified power level, however, may only be obtained by participating in an auction for such a transmit right.

§5.4 Device Service Estimation and Reservation

In some implementations, the spectrum access manager 110 can place limits on the total permissible ambient power and the maximum per-bid time interval, e.g., 1 Watt and 10 minutes, respectively. Thus, in some implementations, the device 400 can calculate and inform the user as to whether the amount of power required for the desired service can be achieved within the total permissible power cap, given the currently sensed ambient power level. If the desired service cannot be achieved at the current time, the device 400 and/or the spectrum access manager 110 can provide an estimate of when the service might become achievable. The device 400 can, subject to the user's approval, transmit a bid to be placed for the desired service at the estimated time.

For example, a user of the device 400 may desire to transmit a 10 MB file over the wide area network 104. However, at a current congestion level, the dynamic auction price may be at a level that is cost prohibitive for the user, e.g., bids currently received by the spectrum access manager 110 are in excess of the maximum bid specified by the user of the device 400. However, the device 400 may receive an estimation from the spectrum access manager 110 that such service may become available/affordable several hours from a current time. Such an estimation can be based on historical usage data, for example. The device 400 can then submit a bid for the estimate power level and time required for the service to reserve the service at the later time.

§6.0 Example Spectrum Allocation Processes

Figure 5:
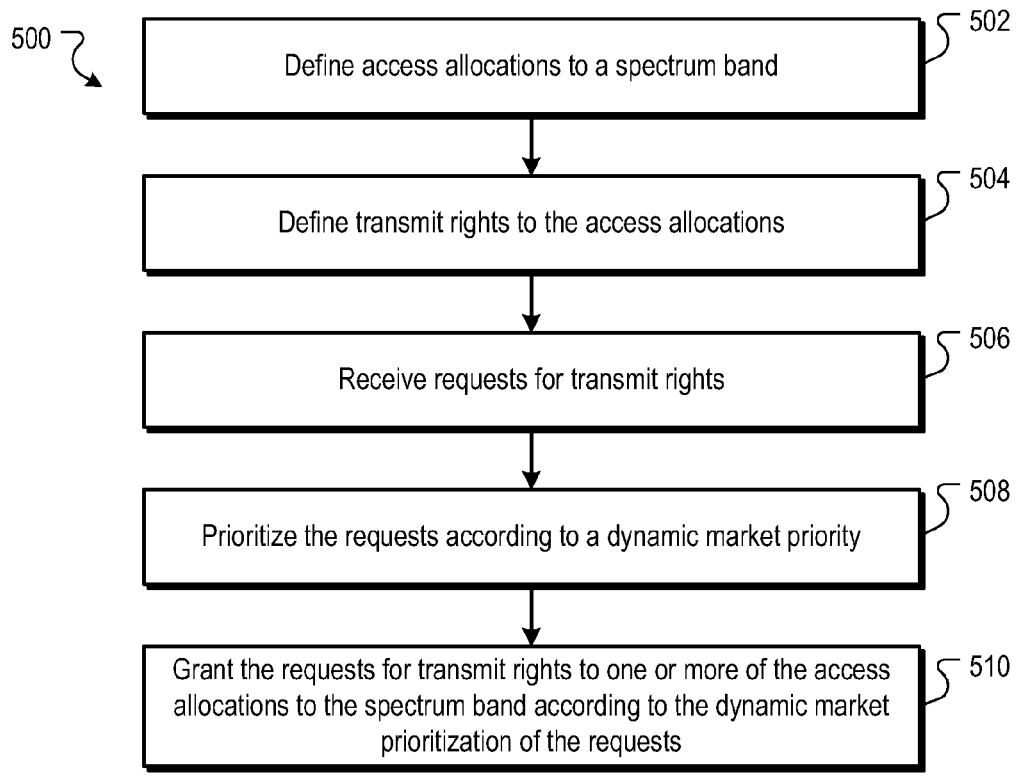
FIG. 5 is a flow diagram of a process for granting access requests to a spectrum.

FIG. 5 is a flow diagram of a process 500 for granting access requests to a spectrum. The process 500 can, for example, be implemented in the spectrum access manager 110 described in FIGS. 1C-3.

Stage 502 defines access allocations to a spectrum band. For example, the spectrum access manager 110, or a subsystem therein, such as the transmit rights manager 120, can define access allocations. Example access allocations can include CDMA channels, or other communication protocol channels, e.g., frequency bands in the spectrum, time division slices in a TDMA communication protocol, frequency hopping channels, etc.

Stage 504 defines transmit rights to the access allocations. For example, the spectrum access manager 110, or a subsystem therein, such as the transmit right manager 120 can define transmit rights for the access allocations, such as rights to transmit up to a maximum power cap during a unit time. In some implementations, the transmit rights can be grouped according to congestion levels.

Stage 506 receives requests for transmit rights. For example, the spectrum access manager 110, or a subsystem therein, such as the request manager 122, can receive access requests that include one or more bids for a transmit right and one or more request for an allocated transmit right. In some implementations, the bids can be grouped according to congestion levels.

Stage 508 prioritizes the request according to a dynamic market priority. For example, the spectrum access manager 110, or a subsystem therein, such as the request manager 122 can prioritize the requests based on bid values and whether the request is a request for an allocated transmit right.

Stage 510 grants the request for the transmit rights to one or more of the access allocations according to the dynamic market prioritization of the requests. For example, the spectrum access manager 110, or a subsystem therein, such as the request manager 122, can award transmit rights according to the prioritization resulting from stage 508.

Figure 6:
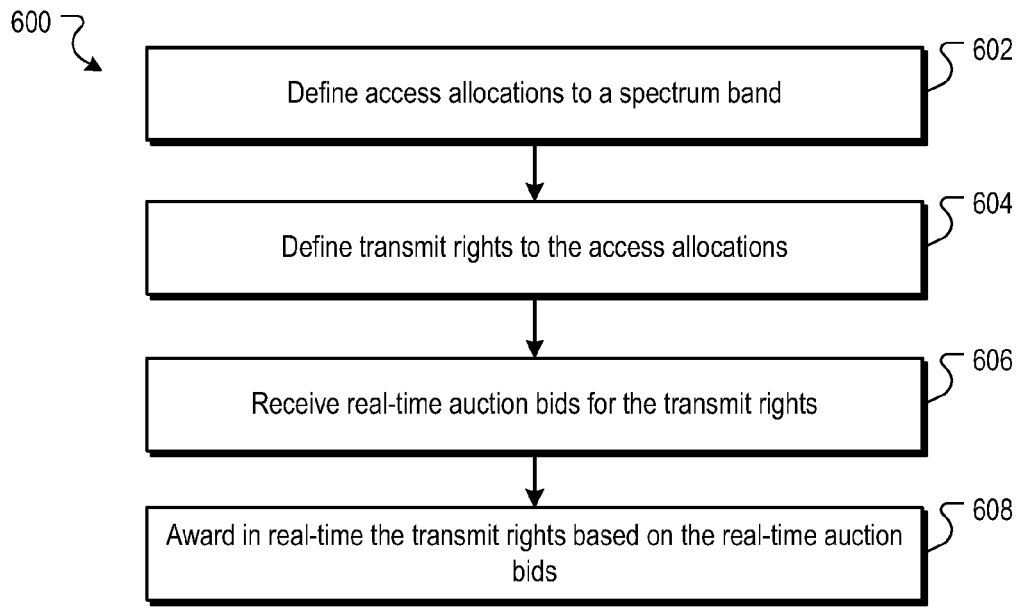
FIG. 6 is a flow diagram of a process for auctioning access allocations to a spectrum.

FIG. 6 is a flow diagram of a process 600 for auctioning access allocations to a spectrum. The process 600 can, for example, be implemented in the spectrum access manager 110 described in FIGS. 1C-3.

Stage 602 defines access allocations to a spectrum band. For example, the spectrum access manager 110, or a subsystem therein, such as the transmit rights manager 120, can define access allocations. Example access allocations can include CDMA channels, or other communication protocol channels, e.g., frequency bands in the spectrum, time division slices in a TDMA communication protocol, frequency hopping channels, etc.

Stage 604 defines transmit rights to the access allocations. For example, the spectrum access manager 110, or a subsystem therein, such as the transmit rights manager 120 can define transmit rights for the access allocations, such as rights to transmit up to a maximum power cap during a unit time. In some implementations, the transmit rights can be grouped according to congestion levels.

Stage 606 receives real-time auction bids for transmit rights. For example, the spectrum access manager 110, or a subsystem therein, such as the request manager 122, can receive real-time auction bids for transmit rights. In some implementations, the bids can be grouped according to congestion levels.

Stage 608 awards the transmit rights in real-time based on the auction bids. For example, the spectrum access manager 110, or a subsystem therein, such as the request manager 122, can award transmit rights in real-time based on the auction bids received in stage 606.

Figure 7:
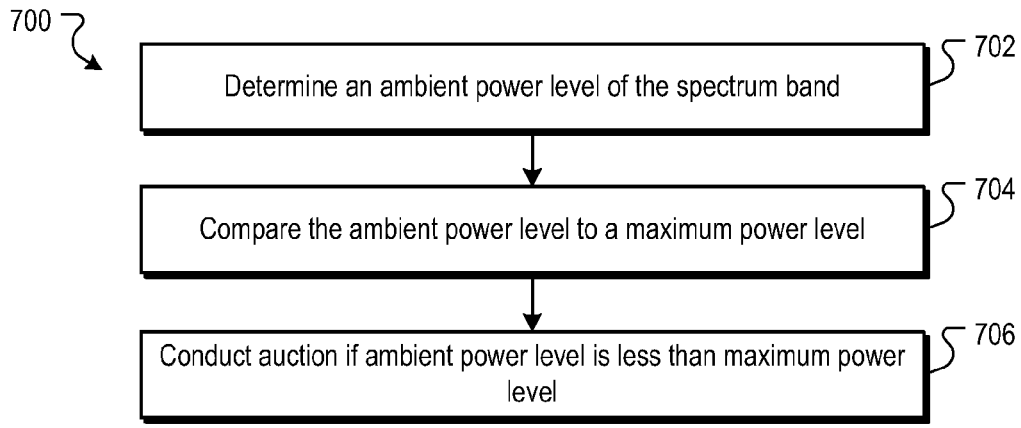
FIG. 7 is a flow diagram of a process for determining when access allocations are available for auction.

FIG. 7 is a flow diagram of a process 700 for determining when access allocations are available for auction. The process 700 can, for example, be implemented in the spectrum access manager 110 described in FIGS. 1C and 2.

Stage 702 determines an ambient power level of the spectrum band. For example, the spectrum access manager 110, or a subsystem therein, such as the transmit rights manager 122, can determine an ambient power level by measuring a current radio frequency power level in the managed spectrum.

Stage 704 compares the ambient power level to a maximum power level. For example, the spectrum access manager 110, or a subsystem therein, such as the transmit rights manager 122, can compare the ambient power level to a maximum power level measured in stage 702.

Stage 706 conducts an auction if the ambient power level is less than maximum power level. For example, the spectrum access manager 110, or a subsystem therein, such as the request manager 122, can conduct an auction if the ambient power level is less than maximum power level.

Figure 8:
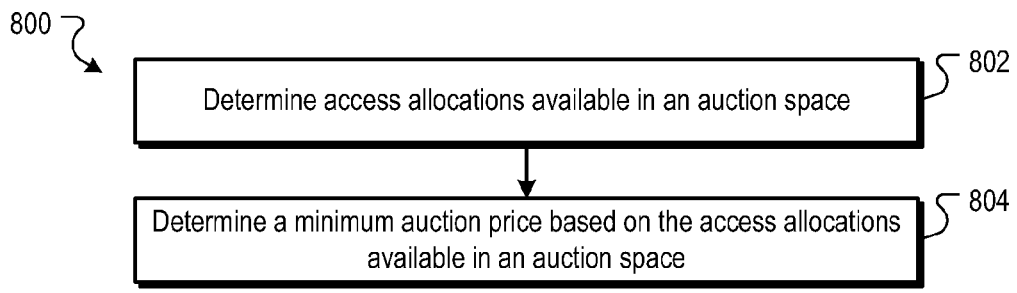
FIG. 8 is a flow diagram of a process for determining a minimum auction price for an access allocation.

FIG. 8 is a flow diagram of a process 800 for determining a minimum auction price for an access allocation. The process 800 can, for example, be implemented in the spectrum access manager 110 described in FIGS. 1C and 2.

Stage 802 determines access allocations available in an auction space. For example, the spectrum access manager 110, or a subsystem therein, such as the transmit rights manager 120 or the request manager 122, can determine whether access allocations are available in an auction space, e.g., by determining an estimated number of channels available; by determining if a predetermined number of access allocations are being utilized; or by determining if an ambient power level is below a maximum power level.

Stage 804 determines the minimum auction price based on the access allocations available in the auction space. For example, the spectrum access manager 110, or a subsystem therein, such as the request manager 122, can obtain a minimum auction price based on the number of channels available, e.g., $0.00, or a nominal fee, when less than the predetermined number of access allocations are being utilized. Conversely, if there are more user devices requesting access to the spectrum than there are allocation channels available, then the minimum auction price can be set based on the values of auction bids received.

Figure 9:
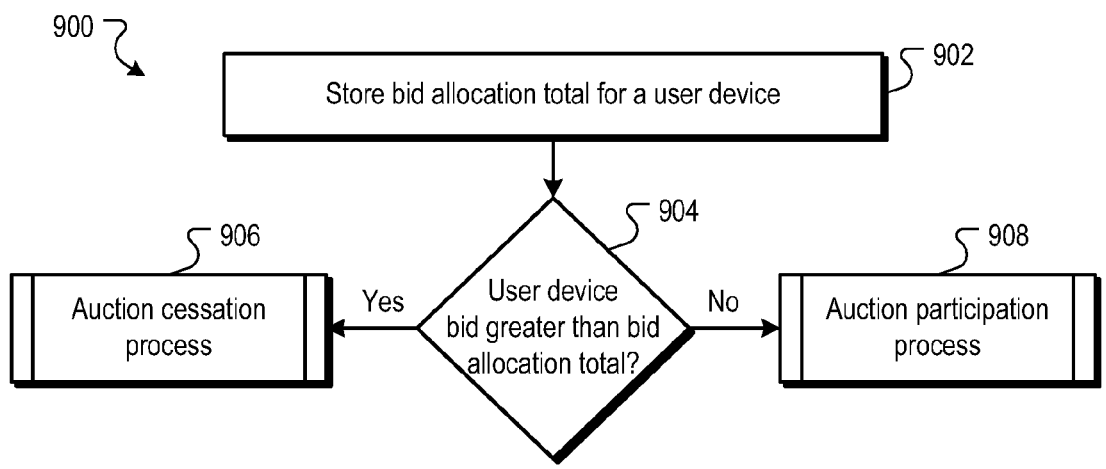
FIG. 9 is a flow diagram of a process for managing access requests for a user device.

FIG. 9 is a flow diagram of a process 900 for managing access requests for a user device. The process 900 can, for example, be implemented in the device 400 of FIG. 4.

Stage 902 stores a bid allocation total for a user device. For example, the device 400 of FIG. 4 can store a bid allocation total in the data store 404.

Stage 904 determines if the user device bid is greater than the bid allocation total. For example, the device 400 of FIG. 4 can determine if a bid to be transmitted is greater that the stored bid allocation.

If stage 904 determines that the user device bid is greater than the bid allocation total, the stage 906 performs an auction cessation process. For example, the device 400 of FIG. 4 can notify the user that the device can no longer participate in the auction; or that the user should increase the bid allocation; or that the user should deposit additional funds in an auction account associated with the device 400.

Conversely, if stage 904 determines that the user device bid is not greater than the bid allocation total, the stage 908 performs an auction participation process. For example, the device 400 of FIG. 4 can transmit the bid to the spectrum access manager 110 and await a notification of whether the device 400 has been awarded a transmit right.

The process 900 can also be implemented in the spectrum access manager 110 of FIGS. 1C-3.

Figure 10:
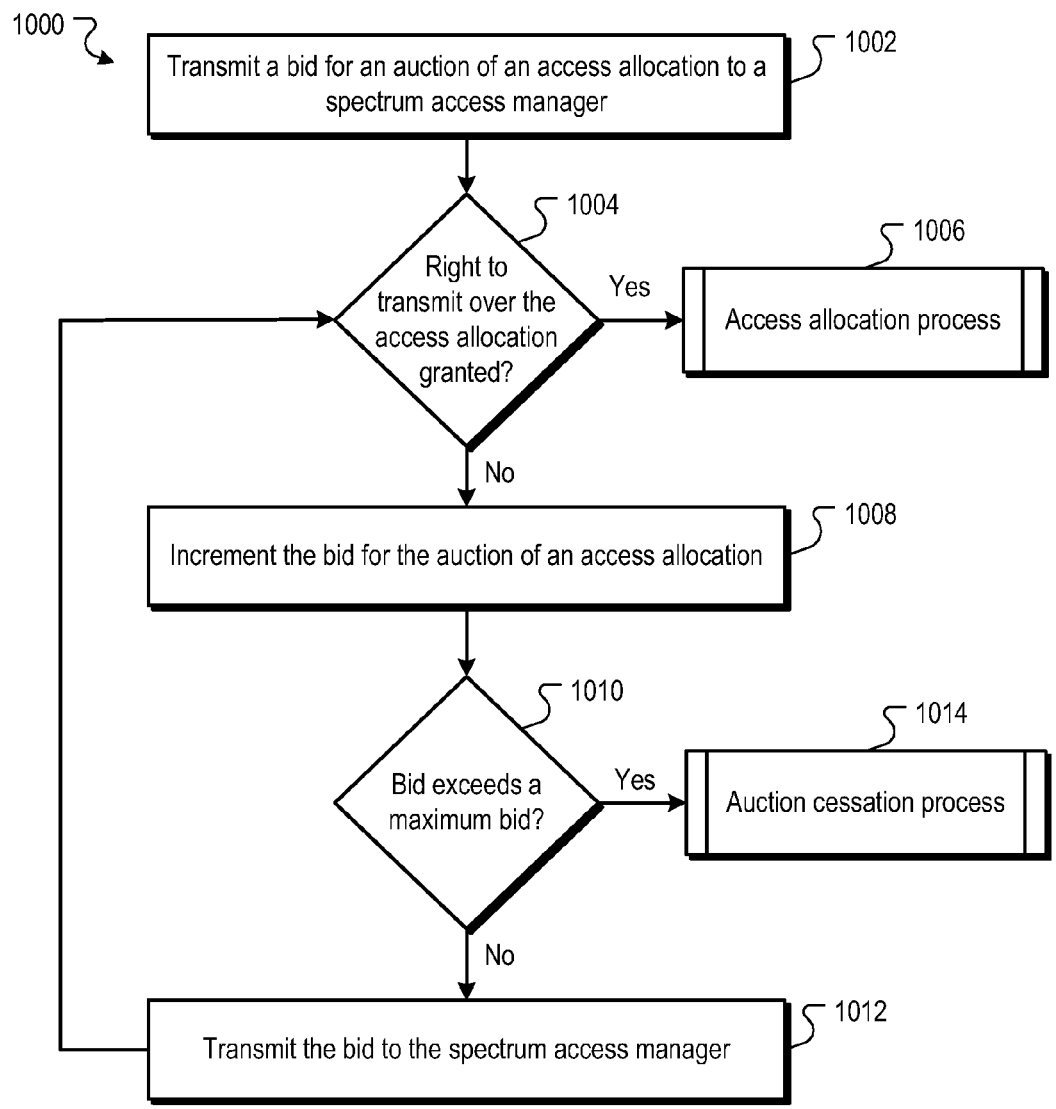
FIG. 10 is a flow diagram of a process for requesting access to a spectrum.

FIG. 10 is a flow diagram of a process 1000 for requesting access to a spectrum. The process 1000 can, for example, be implemented in the device 400 of FIG. 4.

Stage 1002 transmits a bid for an auction of an access allocation to a spectrum access manager. For example, the device 400 of FIG. 4 can transmit a bid, such an initial bid of $0.00, to the spectrum access manager 110.

Stage 1004 determines if a right to transmit over the access allocation has been granted. For example, the device 400 of FIG. 4 can receive data from the spectrum access manager 110 and determine whether a transmit right has been awarded in response to the transmitted bid.

If stage 1004 determines that a right to transmit over the access allocation has been granted, the stage 1006 performs an access allocation process. For example, the device 400 of FIG. 4 can begin transmitting and receiving data over the spectrum for the duration of the transmit right, e.g., for a unit of time, or up to a permissible power cap, or up to a received amount of data.

Conversely, if stage 1004 determines that a right to transmit over the access allocation has not been granted, then stage 1008 increments the bid for the auction of the access allocation. For example, the device 400 of FIG. 4 can increment the bid by a minimum amount, e.g., $0.01, or some other incremental amount.

Stage 1010 determines if the incremented bid exceeds a maximum bid. For example, the device 400 of FIG. 4 can compare the incremental bid to a stored value, e.g., $0.05, that defines the maximum price the user is willing to pay to access the spectrum.

If stage 1010 determines that the incremented bid does not exceed the maximum bid, then stage 1012 transmits the bid to the spectrum access manager 110, and the process 1000 returns to stage 1004. Conversely, if stage 1010 determines that the incremented bid does exceed the maximum bid, then stage 1014 performs an auction cessation process. For example, the device 400 of FIG. 4 can notify the user that the device can no longer participate in the auction; or that the user should increase the maximum bid.

The example processes of FIGS. 6-10 above can be implemented in computer devices. The computer devices can use data representative of the elements described in each of the flow diagrams above. For example, each bid can be represented by bid data; a request for a transmit right can be represented by request data; a sensed ambient power level can be represented by ambient power level data; etc.

§7.0 Summary

A spectrum access manager 110 can facilitate dynamic spectrum allocation and access. A per-device license fee access scheme and/or a real-time auction access scheme can be separately or concurrently implemented. In some implementations, the purchase of a device 400 can include a fixed, pre-determined license fee that secures an allocated transmit right at a specified maximum power level. The time period of the allocated transmit right can be a device lifetime or a renewable period, e.g., monthly, yearly, etc.

The real-time auction access scheme receives bids for transmit rights and awards the bids based on the dynamic market priority, e.g., a dynamic valuation of spectrum access as determined by the values of received bids. In some implementations, the bids are for transmit rights for a specified amount of power for a specified interval of time. The specified amounts of power and specified intervals of time can likewise be determined based on the market priorities, e.g., low congestion service areas may have transmit rights for longer time intervals, e.g., 10 minutes, while high congestion service areas may have transmit rights for shorter time intervals, e.g., 10 seconds, etc.

Other transmit rights can also be used. For example, transmit rights can be for a right to transmit a number of packets, or an amount of data. Pricing of such transmit rights can be determined according to the values of received bids.

In some implementations, the spectrum access manager 110 can group devices bidding at any particular time with a common sensed ambient power level into a power level grouping. The grouping can be for one or more service areas, e.g., across a country, so that so that each device in the grouping is bidding against other device with similar power demands, thus facilitating equality in valuation. Transmit rights can be similarly grouped.

Different auction types can be used. The auction can continue until either a maximum power level or maximum bid for a service area has been reached, or the device has successfully acquired rights to the power level and time interval requested. Prepaid, monthly, or any other billing model can be supported. In some implementations, a total amount spent in a billing cycle by the consumer can be displayed on the device.

Other economic mechanisms can also be used instead of or in addition to auctions. For example, different economic mechanism design principles can be used to achieve a desirable outcome despite the self-interest and private information of participants (users) of the system.

Access to different bands other than those provided in the examples in this specification can also be used. For example, auctioned access to the Worldwide Interoperability for Microwave Access (WiMAX) can be facilitated in any of the WiMAX spectrum profiles of 2.3 GHz, 2.5 GHz and 3.5 GHz, for example. Access to other bands can also be facilitated.

Although subscribers are illustrated in the context of devices for which a periodic or lifetime device fee is paid, allocations can also be allowed for other types devices. Devices associated with public safety entities, military applications, and other regulatory and/or governmental entities can have additional priority rights to the spectrum. For example, devices associated with public safety entities may have a higher priority than devices associated with private citizens.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium, such as a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method for requesting access to a spectrum band, comprising:
    sensing, by a mobile device, an ambient level for a portion of an electromagnetic spectrum over which the mobile device communicates wirelessly;
    determining, by the mobile device, and based on the sensed ambient power level, an amount of power required to achieve a desired service within a total permissible power cap during a unit of time;
    transmitting, by the mobile device, a bid for an auction of an access allocation to a spectrum access manager that groups received bids into at least two different groups according to their respectively sensed ambient power levels and, for each group of bids, auctions access allocation according to the received bids that belong to the group of bids, the access allocation being an allocation for access to a portion of the electromagnetic spectrum, and wherein the bid includes the sensed ambient power level;
    determining, in response to the transmitted bid, that a right to transmit data over the access allocation is not granted, and in response to the determination:
        iteratively incrementing the bid for the auction of the access allocation and transmitting the bid to the spectrum access manager; and
        determining, in response each transmitted bid, whether a right to transmit data over the access allocation is granted or whether the bid exceeds a maximum bid; and
        continuing iteratively incrementing the bid and transmitting the bid until a positive determination of one of a right to transmit data over the access allocation is granted or the bid exceeds a maximum bid.

2. The method of claim 1, wherein the access allocation is an allocation of a code division multiple access (CDMA) channel.

3. The method of claim 1, wherein the right to transmit data over the access allocation is a right to transmit data for the unit of time.

4. The method of claim 1, further comprising:
    storing an allocation bid total;
    deducting each bid that results in a granting of a transmit right from the allocation bid total; and
    terminating auction participation if the allocation bid total is less than the bid.

5. A system for accessing a spectrum band, comprising:
    a communication device, comprising:
        a communication subsystem that transmits and receives data over the spectrum band;
        a processing subsystem in communication with the communication subsystem that processes data received over the communication subsystem and for transmission over the communication subsystem; and
        a data store storing instructions executable by the processing subsystem;
    wherein upon execution of the instructions stored in the data store, the processing subsystem and the communication subsystem perform operations comprising:
        sensing an ambient power level for a portion of an electromagnetic spectrum over which the communication device communicates wirelessly;
        determining, based on the sensed ambient power level, an amount of power required to achieve a desired service within a total permissible power cap during a unit of time;
        transmitting a bid for an auction of an access allocation to a spectrum access manager that groups received bids into at least two different groups according to their respectively sensed ambient power levels and, for each group of bids, auctions access allocation according to the received bids that belong to the group of bids, the access allocation being an allocation for access to an auctioned portion of the electromagnetic spectrum;
        determining, in response to the transmitted bid, that a right to transmit data over the access allocation is not granted, and in response to the determination:
            iteratively incrementing the bid for the auction of the access allocation and transmitting the bid to the spectrum access manager; and
            determining, in response each transmitted bid, whether a right to transmit data over the access allocation is granted or whether the bid exceeds a maximum bid; and
            continuing iteratively incrementing the bid and transmitting the bid until a positive determination of one of a right to transmit data over the access allocation is granted or the bid exceeds a maximum bid.

6. The system of claim 5, wherein the communication subsystem transmits according to a code division multiple access (CDMA) communication protocol, and wherein the access allocation comprises a CDMA channel.

7. The system of claim 5, wherein the communication device is a hand-held data and voice communication device.

8. The system of claim 5, wherein upon execution of the instructions stored in the data store, the processing subsystem further performs the operations of:
    storing an allocation bid total in the data store;
    deducting each bid that results in a granting of a transmit right from the allocation bid total; and
    terminating auction participation if the allocation bid total is less than the bid.

9. The system of claim 5, further comprising:
    an access device that transmits and receives data over the spectrum band and transmits and receives data over a network;
    a spectrum access manager, comprising:
        a communication subsystem that transmits and receives data over the network;
        a processing subsystem in communication with the communication subsystem that processes data received over the communication subsystem and for transmission over the communication subsystem; and
        a data store storing instructions executable by the processing subsystem;
    wherein upon execution of the instructions stored in the data store, the processing subsystem and the communication subsystem perform operations comprising:
        receiving bids from the communication device and other communication devices;

grouping the bids according to their respectively sensed ambient power levels, and wherein at least two different groups of bids are generated by the grouping of bids;

for each respective group of bids, auctioning the access allocation according to the received bids that belong to the group of bids; and transmitting data to the communication device indicating whether a right to transmit data over the access allocation is granted to the communication device.

10. The system of claim 9, wherein the processing subsystem of the request manager, upon execution of the instructions stored in the data store of the request manager, further performs the operations of:

storing an allocation bid total for the communication device in the data store;

deducting each bid that results in a granting of a transmit right to the communication device from the allocation bid total; and rejecting a bid from the communication device if the allocation bid total is less than the bid.

\* \* \* \* \*

UNITED STATES PATENT AND TRADEMARK OFFICE
CERTIFICATE OF CORRECTION

| | | |
|---|---|---|
| PATENT NO. | : 8,170,048 B1 | Page 1 of 1 |
| APPLICATION NO. | : 12/363282 | |
| DATED | : May 1, 2012 | |
| INVENTOR(S) | : Carroll Philip Gossett et al. | |

It is certified that error appears in the above-identified patent and that said Letters Patent is hereby corrected as shown below:

In Claim 1, Line 17, Column 19, after "ambient" insert -- power -- therefor.

In Claim 1, Line 40, Column 19, after "response" insert -- to -- therefor.

In Claim 5, Line 28, Column 20, after "response" insert -- to -- therefor.

Signed and Sealed this
Twenty-sixth Day of June, 2012

David J. Kappos
*Director of the United States Patent and Trademark Office*